United States Patent
Yamamoto et al.

(10) Patent No.: US 7,206,395 B2
(45) Date of Patent: Apr. 17, 2007

(54) TELEPHONE APPARATUS

(75) Inventors: Osamu Yamamoto, Sendai (JP); Hiroyuki Igarashi, Sendai (JP); Shigeki Yokoi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/542,474

(22) PCT Filed: Oct. 19, 2004

(86) PCT No.: PCT/JP2004/015423

§ 371 (c)(1),
(2), (4) Date: Jul. 15, 2005

(87) PCT Pub. No.: WO2005/039162

PCT Pub. Date: Apr. 28, 2005

(65) Prior Publication Data

US 2006/0140379 A1    Jun. 29, 2006

(30) Foreign Application Priority Data

Oct. 20, 2003    (JP)    ............................. 2003-359426

(51) Int. Cl.
*H04M 1/56* (2006.01)
*H04M 3/42* (2006.01)

(52) U.S. Cl. ........................... 379/142.06; 379/142.08; 379/215.01

(58) Field of Classification Search ........... 379/142.01, 379/142.06, 142.08, 207.13, 210.01, 215.01, 379/210.02
See application file for complete search history.

(56) References Cited

U.S. PATENT DOCUMENTS 5,511,111 A * 4/1996 Serbetcioglu et al. .... 379/88.01
5,796,806 A * 8/1998 Birckbichler ............... 379/88.2
6,366,661 B1* 4/2002 Devillier et al. ........ 379/211.01
6,377,668 B1* 4/2002 Smock et al. .......... 379/142.08
6,498,841 B2* 12/2002 Bull et al. ............. 379/142.08
6,826,159 B1* 11/2004 Shaffer et al. .............. 370/260

FOREIGN PATENT DOCUMENTS

| JP | 4144461 | 5/1992 |
| JP | 11252254 | 9/1999 |
| JP | 2000 165520 | 6/2000 |

OTHER PUBLICATIONS

PCT International Search Report dated Nov. 16, 2004.

* cited by examiner

*Primary Examiner*—Bing Q. Bui
(74) *Attorney, Agent, or Firm*—Stevens, Davis, Miller & Mosher, LLP (57) ABSTRACT

A portable telephone apparatus 100 according to the present invention comprises a call waiting section and a telephone number acquisition section that can acquire telephone numbers of telephone apparatuses on the other end of lines. A telephone directory information registration section 109 registers telephone numbers associated with information on names. A caller confirmation section searches a telephone number of the telephone directory information registration section 109 based on the telephone number acquired by the telephone number acquisition section and confirms the caller. A character string speech conversion section converts the character information on the name of the confirmed caller to speech information. A caller information notification section notifies the user of the speech information from the character string speech conversion section when an incoming call arrives during a call with speech at a volume level which does not disturb the call.

3 Claims, 6 Drawing Sheets

| | |
|---|---|
| PRESENCE/ABSENCE OF TELEPHONE NUMBER SPEECH NOTIFICATION | TELEPHONE NUMBER SPEECH NOTIFICATION PRESENCE/ABSENCE DATA |
| NAME | TELEPHONE DIRECTORY DATA (1) |
| TELEPHONE NUMBER 1 | |
| TELEPHONE NUMBER 2 | |
| MEMO | |
| SPEECH NOTIFICATION CHARACTER STRING | |
| PRESENCE/ABSENCE OF SPEECH NOTIFICATION DURING CALL | |
| ⋮ | ⋮ |
| TARO MATSUSHITA | TELEPHONE DIRECTORY DATA (n-1) |
| 123456789 | |
| 987654321 | |
| COMPANY-RELATED INFOMATION | |
| TARO MATSUSHITA | |
| PRESENCE OF SPEECH NOTIFICATION DURING CALL | |
| HANAKO MATSUSHITA | TELEPHONE DIRECTORY DATA (n) |
| 111222333 | |
| 090123456 | |
| FRIEND | |
| HANAKO MATSUSHITA | |
| ABSENCE OF SPEECH NOTIFICATION DURING CALL | |

FIG.6

TELEPHONE APPARATUS

TECHNICAL FIELD

The present invention relates to a telephone apparatus having a call waiting function for notifying a user of an incoming call received during a call in progress, holding the call in progress and connecting the incoming call.

BACKGROUND ART

As a conventional telephone apparatus, a call waiting function is known which when notified through a tone by an exchange that a call has arrived from another caller while a call is in progress, orally notifies the other party currently in communication that the other call has arrived, holds the call in progress without off-hooking the call in progress and allows the user to resume the conversation with the other party who has called later (e.g., see Patent Document 1).

Furthermore, as another conventional telephone apparatus, one provided with a means for recognizing a caller by displaying the telephone number of the caller or the name registered in a telephone directory on a display device provided on a telephone apparatus is known.

[Patent Document 1] Unexamined Japanese Patent Publication No.2000-165520 (pp5-7, FIG. 1

DISCLOSURE OF INVENTION

Problems to be Solved by the Invention

However, the above described conventional telephone apparatus having a call waiting function has a problem that when there is an incoming call from another caller during a conversation with one caller, it is not possible to identify the other caller without holding the call currently in progress and on-hooking the call arriving later to engage conversation.

The other conventional telephone apparatus that displays the telephone number of a caller or the name registered in a telephone directory on a display apparatus has a problem that it is not possible to identify the caller without suspending the conversation and confirming the caller displayed on the display apparatus.

The present invention has been implemented in view of the above described problems and it is an object of the present invention to provide a telephone apparatus capable of deciding whether or not to receive an incoming call without suspending a conversation currently in progress while keeping the call in progress as is.

Means for Solving the Problem

The telephone apparatus according to the present invention comprises a call section that engages conversation with one of a plurality of telephone apparatuses, a call waiting section that notifies, when there is an incoming call during the conversation by the call section, the user of the incoming call, holds the call in progress and connects the incoming call, a telephone number acquisition section that can acquire the telephone number of the telephone apparatus of the other party, a telephone directory information registration section that registers the telephone number associated with information on the name, a caller confirmation section that searches the telephone number of the telephone directory information registration section based on the telephone number acquired by the telephone number acquisition section to confirm the caller, a character string speech conversion section that converts the character information on the name of the caller confirmed by the caller confirmation section to speech information and a caller information notification section that notifies, when the incoming call arrives during a call, the user of the speech information from the character string speech conversion section with speech in a volume which does not disturb the call.

Advantageous Effect of the Invention

In accordance with one aspect of the present invention, the user of the present telephone apparatus can recognize the caller of an incoming call without suspending a conversation currently in progress during a call, and therefore it is possible to decide whether or not to accept the incoming call.

BEST MODE FOR CARRYING OUT THE INVENTION

An essence of the present invention is to search a telephone number of a telephone directory information registration section based on a telephone number acquired by a telephone number acquisition section, confirm a caller, convert, when an incoming call arrives during a call, character information on the name of the confirmed caller to speech information through a character string speech conversion section and notify the user of the speech information through speech at a volume level that does not disturb the call.

Now, embodiments of the present invention will be described in detail with reference to the attached drawings.

EMBODIMENT

Figure 1:
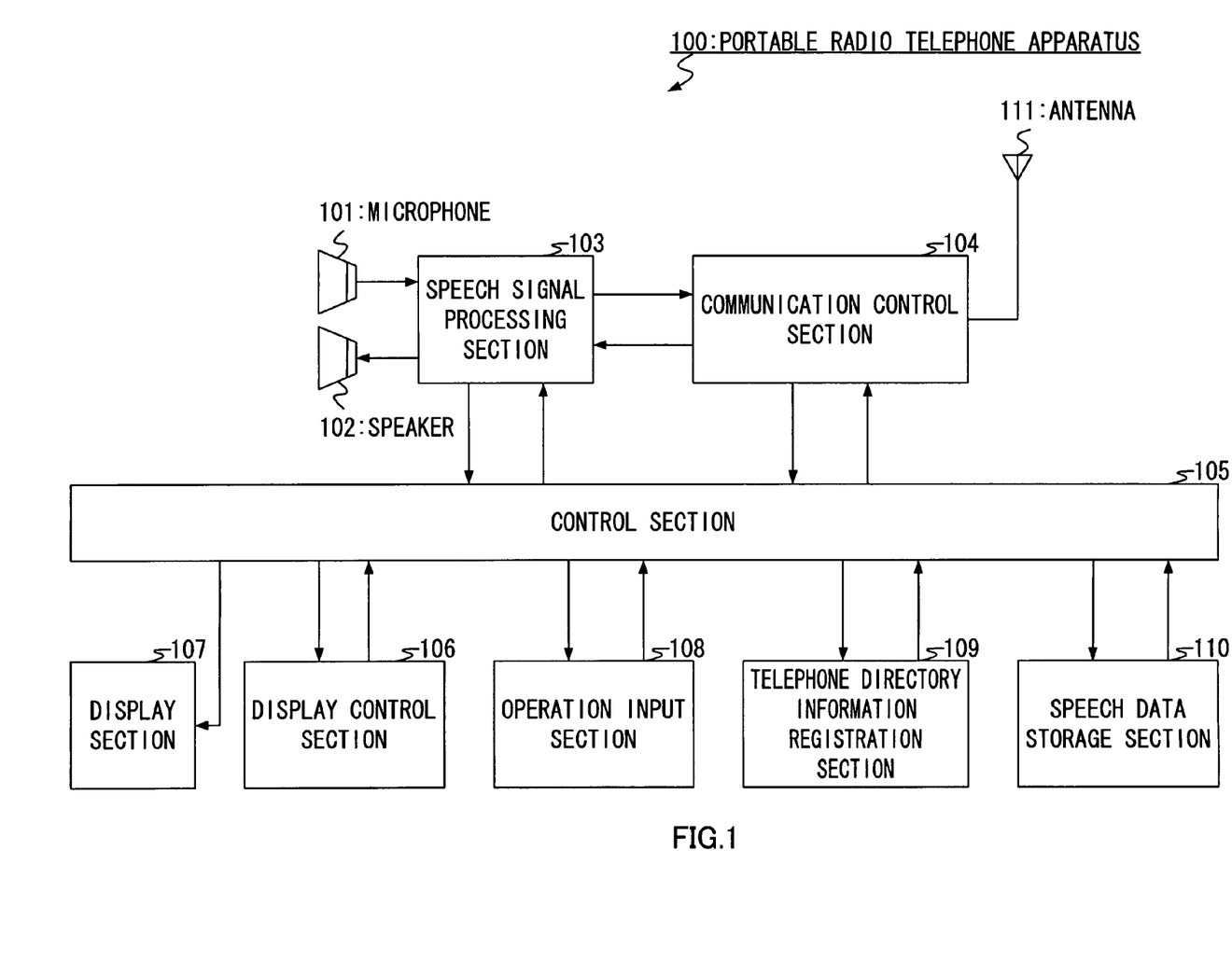
FIG. 1 is a block diagram showing an example of the structure of a portable radio telephone apparatus according to an embodiment of the present invention.

FIG. 1 is a block diagram showing the structure of a portable radio telephone apparatus according to an embodiment of the present invention.

As shown in FIG. 1, a portable radio telephone apparatus 100 according to an embodiment of the present invention is provided with a microphone 101, a speaker 102, a speech signal processing section 103, a communication control section 104, a control section 105, a display control section 106, a display section 107, an operation input section 108, a telephone directory information registration section 109, a speech data storage section 110 and an antenna 111.

The microphone 101 receives speech, generates a speech signal and gives the speech signal to the speech signal processing section 103. The speaker 102 receives the speech signal from the speech signal processing section 103 and outputs speech. The speech signal processing section 103 receives the speech from the microphone 101, processes the speech signal and gives the speech signal to the communication control section 104. Furthermore, the speech signal processing section 103 processes the speech signal from the communication control section 104 and gives the speech signal to the speaker 102. The speech signal processing section 103 receives the speech data from the speech data storage section 110 through the control section 105, generates a speech signal and gives the speech signal to the speaker 102.

The communication control section 104 receives the speech signal from the microphone 101 through the speech signal processing section 103, processes the speech signal and gives it to the antenna 111. Furthermore, the communication control section 104 receives information from the operation input section 108 through the control section 105 and gives the information to the antenna 111. Furthermore, the communication control section 104 receives the speech signal from the antenna 111, processes the speech signal and gives it to the speech signal processing section 103. Furthermore, the communication control section 104 receives information from the antenna 111, processes the information and gives it to the control section 105.

The control section 105 controls the speech signal processing section 103, communication control section 104, display control section 106, display section 107, operation input section 108, telephone directory information registration section 109 and speech data storage section 110. The control section 105 is made up of a CPU, etc. The display control section 106 controls information to be displayed. The display section 107 is made up of a liquid crystal display device, etc., and displays information under the control of the display control section 106.

The operation input section 108 is made up of a numeric keypad and other keys and used to input telephone numbers and operation signals. The telephone directory information registration section 109 is used to register telephone numbers and personal information of at least names, etc. The speech data storage section 110 stores speech messages to be offered to the user of the portable radio telephone apparatus 100. The speech data storage section 110 is made up of a magnetic tape, DRAM or E2 PROM, etc. The antenna 111 sends data and speech signals from the communication control section 104 to the telephone apparatus of the other party and receives data and speech signals from the telephone apparatus of the other party and gives them to the communication control section 104.

During a call which is realized through data transmission and reception with a base station through the antenna 111, when the control section 105 receives an incoming call from the telephone apparatus of a caller other than the other party with whom a conversation is in progress through the antenna 111 and communication control section 104, the portable radio telephone apparatus 100 searches the telephone directory information of the telephone directory information registration section 109 based on the telephone numbers which are set in CLI information obtained at the time of reception and decides the sender of the incoming call.

When the sender of the incoming call is decided during a call, the control section 105 decides the presence/absence of an incoming call to the user from the information corresponding to the caller registered in the telephone directory information registration section 109, and when notification of the incoming call is decided to be necessary, the portable radio telephone apparatus 100 creates notification speech data corresponding to the speech notification character string from the speech data stored in the speech data storage section 110, gives the notification speech data to the speaker 102 through the speech signal processing section 103 and notifies the user with a tone which does not disturb the call. The user of the portable radio telephone apparatus 100 can operate the operation input section 108 to communicate with the user of the telephone apparatus of the incoming call. That is, when an incoming call arrives during a call, the portable radio telephone apparatus 100 has a call waiting function which notifies the user of the incoming call, holds the call in progress and connects the incoming call.

Next, the operation of the portable radio telephone apparatus 100 according to an embodiment of the present invention will be explained in further detail with reference to FIG. 1 to FIG. 6. Here, detailed explanations are provided about the operation of the portable radio telephone apparatus 100 according to an embodiment of the present invention when there is an incoming call from a telephone apparatus of another party during a conversation with one party, the presence or absence of incoming call notification is decided and the user is notified of the incoming call with speech information when the incoming call notification is decided to be necessary.

Figure 2:
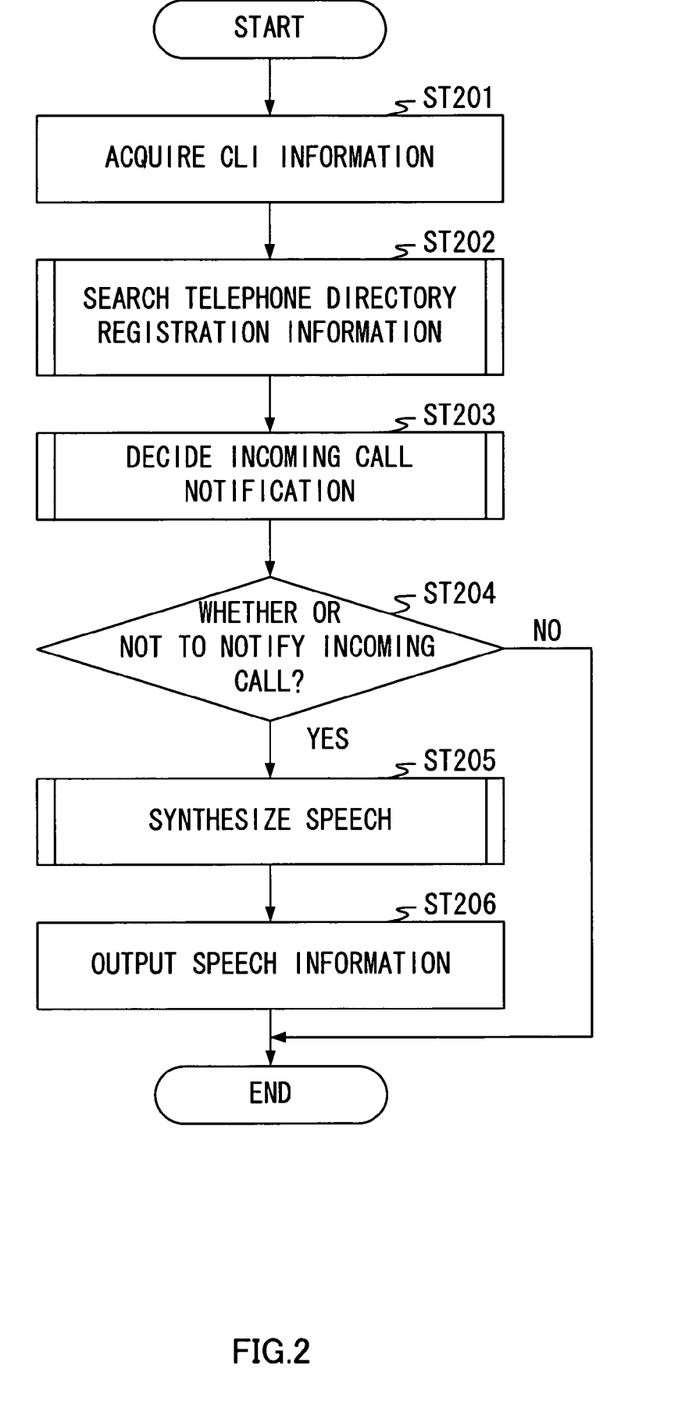
FIG. 2 is a flow chart illustrating the operation of the portable radio telephone apparatus according to the embodiment of the present invention.

FIG. 2 is a flow chart illustrating the operation of the portable radio telephone apparatus 100 according to the embodiment of the present invention.

As shown in FIG. 2, when there is an incoming call during a call, the portable radio telephone apparatus 100 acquires CLI (Calling Line Identity) information on the incoming call (step ST201), searches telephone directory registration information(step ST202), decides incoming call notification (step ST203), decides whether or not to perform incoming call notification(step ST204), synthesizes speech (step ST205) and outputs speech information (step ST206).

Figure 3:
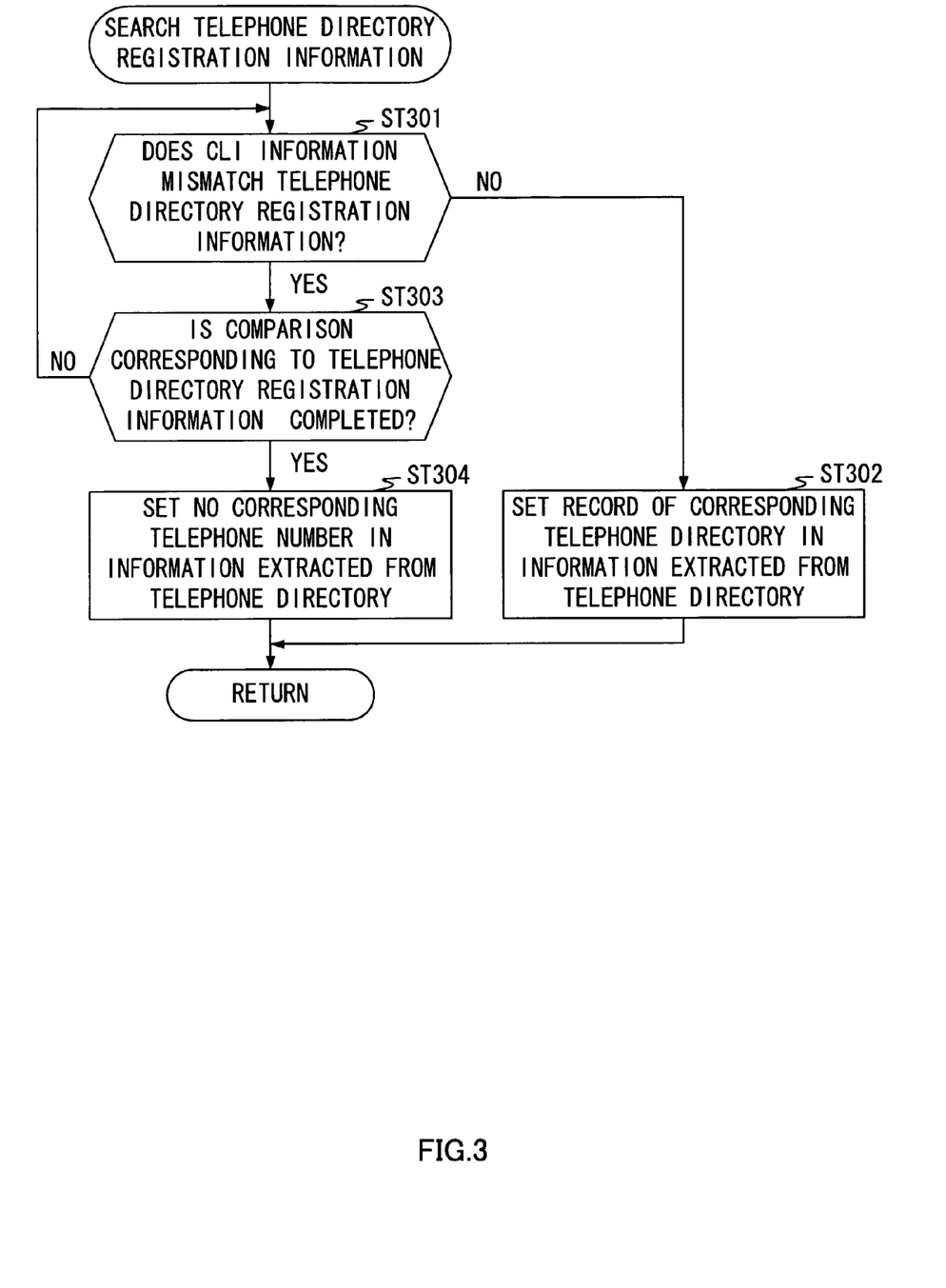
FIG. 3 is a flow chart illustrating the detailed operation in the step of searching telephone directory registration information in FIG. 2.

FIG. 3 is a flow chart illustrating the detailed operation in step ST202 of searching the telephone directory registration information in FIG. 2.

As shown in FIG. 3, the portable radio telephone apparatus 100 decides whether the CLI information (telephone number) mismatches the telephone directory registration information (registered telephone number) or not (step ST301). In this case, the portable radio telephone apparatus 100 compares, for example, telephone number 1 or telephone number 2 of the telephone directory data written in FIG. 6 which is set in the telephone directory information registration section 109 with the telephone number of the incoming caller which is set in the CLI information. When the CLI information (telephone number) does not mismatch the telephone directory registration information (registered telephone number) in step ST301, the portable radio telephone apparatus 100 sets the corresponding telephone directory data record in the telephone directory extraction information (step ST302) and the operation returns to the flow in FIG. 2.

Furthermore, when the CLI information (telephone number) mismatches the telephone directory registration information (registered telephone number) in step ST301, the portable radio telephone apparatus 100 decides whether the comparison corresponding to the telephone directory registration information in step ST301 has been completed or not (step ST303) When the comparison corresponding to the telephone directory registration information in step ST303 has not been completed, the operation returns to step ST301. When the comparison corresponding to the telephone directory registration information in step ST303 has been completed, the portable radio telephone apparatus 100 sets the absence of the corresponding telephone number in the telephone directory extraction information (step ST304) and the operation returns to the flow in FIG. 2.

Figure 4:
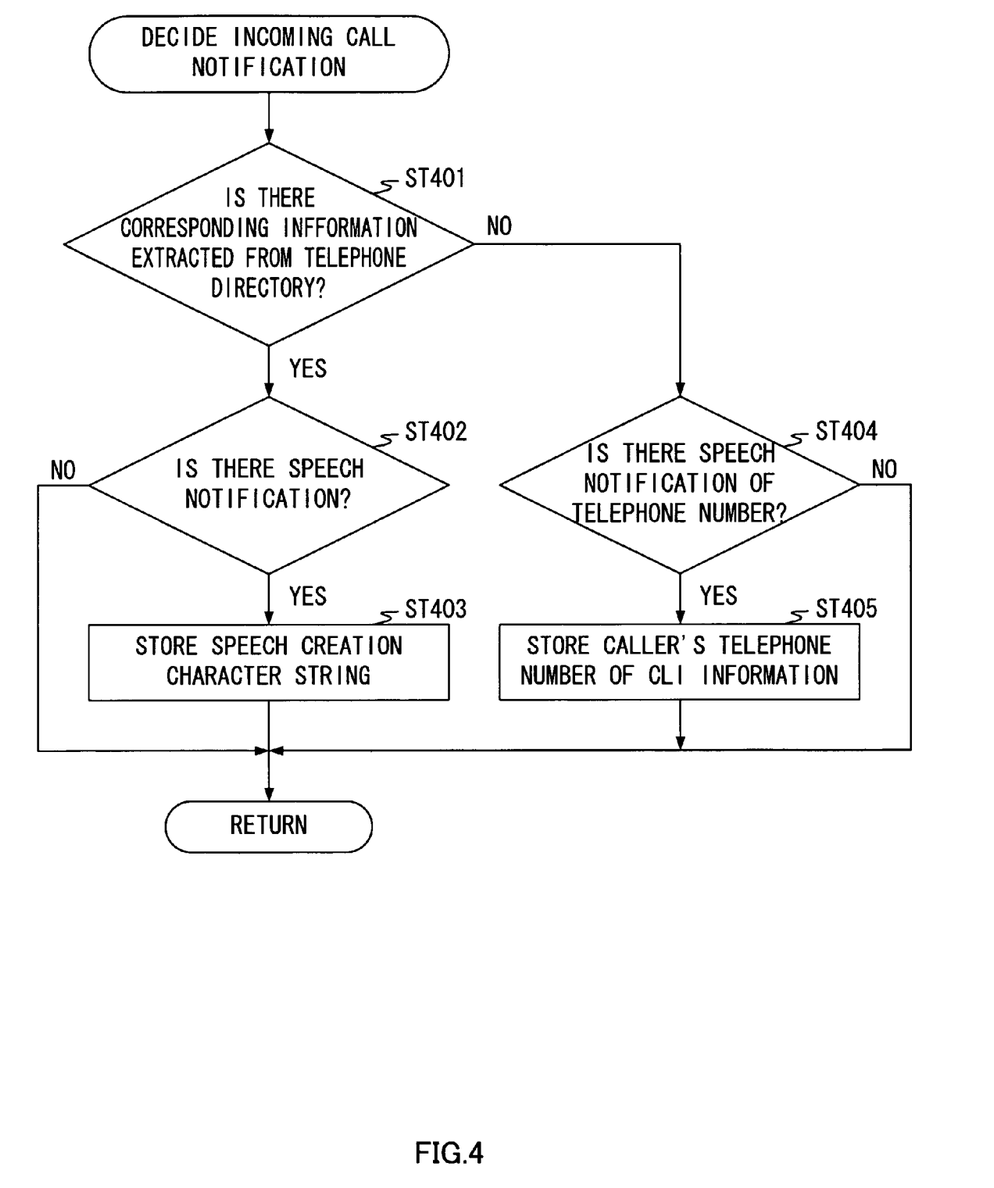
FIG. 4 is a flow chart illustrating the detailed operation in the step of deciding incoming call notification in FIG. 2.

FIG. 4 is a flow chart illustrating the detailed operation in step ST203 of deciding incoming call notification in FIG. 2.

As shown in FIG. 4, the portable radio telephone apparatus 100 decides the presence or absence of the corresponding information extracted from the telephone directory (step ST401). In this case, when the telephone directory data record is set in the information extracted from the telephone directory, the portable radio telephone apparatus 100 decides that there is the corresponding information extracted from the telephone directory and when the telephone directory data record is not set in the information extracted from the telephone directory, the portable radio telephone apparatus 100 decides that there is not the corresponding information extracted from the telephone directory.

In step ST401, when the corresponding telephone directory information exists, information on the presence or absence of speech notification during the call in the corresponding information in the telephone directory data record is acquired and it is decided whether speech notification during the call exists or not (step ST402). When the speech notification exists in step ST402, the speech creation character string of the corresponding information in the telephone directory data record is stored (step ST403) and the operation returns to the flow in FIG. 2. When the speech notification does not exist in step ST402, the operation returns to the flow in FIG. 2.

When the corresponding telephone directory information does not exist in step ST401, the portable radio telephone apparatus 100 decides whether the speech notification of the telephone number exists or not (step ST404). When the speech notification of the telephone number exists in step ST404, the portable radio telephone apparatus 100 stores the caller's telephone number of the CLI information (step ST405) and the operation returns to the flow in FIG. 2. When the speech notification of the telephone number does not exist in step ST404, the operation returns to the flow in FIG. 2.

Figure 5:
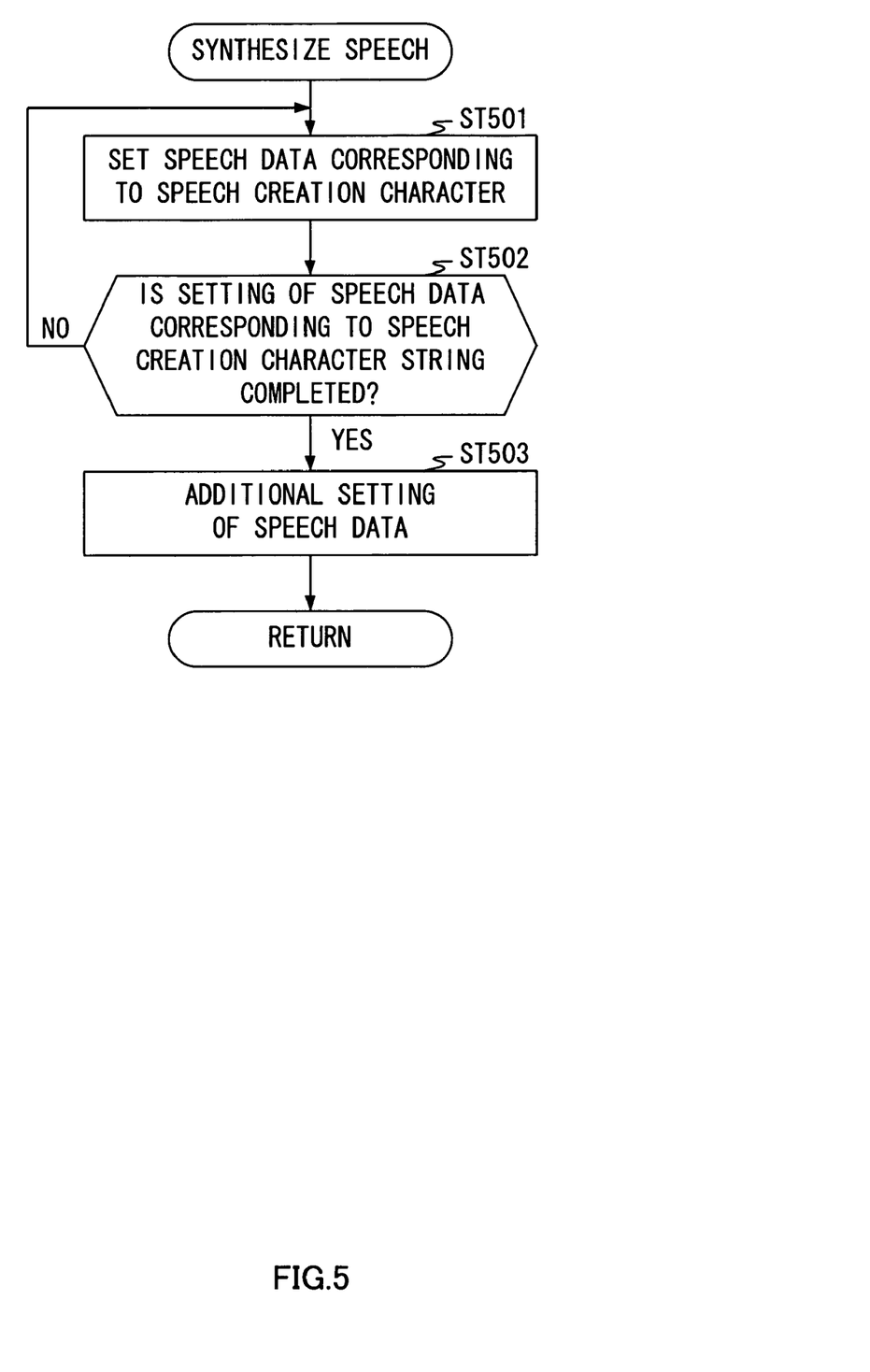
FIG. 5 is a flow chart illustrating the detailed operation in the step of synthesizing speech in FIG. 2.

FIG. 5 is a flow chart illustrating the detailed operation in step ST205 of synthesizing speech in FIG. 2.

As shown in FIG. 5, the portable radio telephone apparatus 100 sets the corresponding speech data in the speech creation character (step ST501). In this case, the portable radio telephone apparatus 100 converts the character string stored in step ST203 to speech data character by character (including numerals) and stores the speech data.

Next, the portable radio telephone apparatus 100 decides whether the setting of the speech data corresponding to the speech creation character string has been completed or not (step ST502). When the setting of the speech data corresponding to the speech notification character string has not been completed in step ST502, the operation returns to step ST501.

When the setting of the speech data corresponding to the speech creation character string has been completed in step ST502, the portable radio telephone apparatus 100 performs an additional setting of the speech data of the speech data storage section 110 (step ST503). In this case, the portable radio telephone apparatus 100 combines fixed speech data such as "Call from Mr. /Ms. . . ." preset in the speech data storage section 110 with the speech data stored in step ST501 and stores the combined data.

Figure 6:
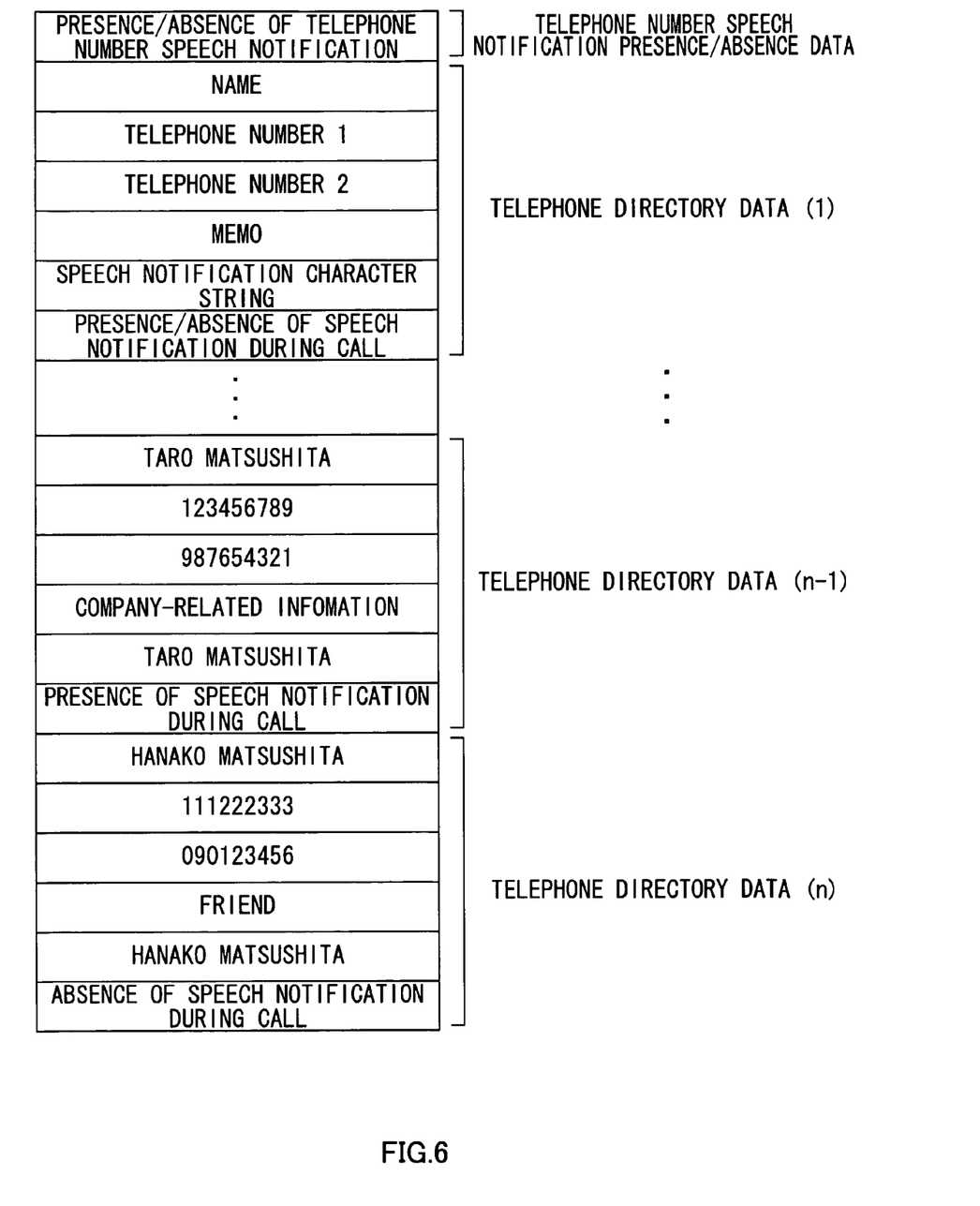
FIG. 6 illustrates an example of information in the telephone directory registration section of the portable radio telephone apparatus according to the embodiment of the present invention.

In step ST206, the speech signal processing section 103 notifies the user of the information on the sender of the incoming call using a tone through the microphone 101. For example, when there is an incoming call from a caller with a telephone number 123456789 during a call, the character string with "Taro Matsushita" corresponding to the telephone directory data (n-1) record in FIG. 6 is converted to speech, combined with the speech information "Call from Mr./Ms. . . ." stored as fixed speech information and the user is notified of "Call from Mr. Taro Matsushita" with speech.

In this embodiment, the portable radio telephone apparatus 100 is provided with an incoming call rejection setting section that makes a setting in the information on the telephone numbers registered by the telephone directory information registration section 109 so that incoming calls are rejected during a call and in the case where the incoming call rejection is set in the information on the telephone number related to the incoming call when the incoming call arrives during a call, the incoming call is not notified to the user, whereas in the case where it is decided that no incoming call should be notified, no response is made to the caller or network. However, it is also possible to send information that the line is currently busy or the user of the portable radio telephone apparatus of the present invention cannot respond to the incoming call from the caller to the caller or network.

A first mode of the present invention comprises a call section that carries out a call with one of a plurality of telephone apparatuses, a call waiting section that notifies, when there is an incoming call during a call using the call section, the user of the incoming call, holds the call in progress and connects the incoming call, a telephone number acquisition section that can acquire the telephone number of the telephone apparatus of the other party, a telephone directory information registration section that registers the telephone number associated with the information on the name, a caller confirmation section that searches the telephone number of the telephone directory information registration section based on the telephone number acquired by the telephone number acquisition section and confirms the caller, a character string speech conversion section that converts the character information on the name of the caller confirmed by the caller confirmation section to speech information and a caller information notification section that notifies, when the incoming call arrives during a call, the speech information to the user from the character string speech conversion section with speech at a volume level which does not disturb the call.

This configuration allows the user of the present telephone apparatus to know the sender of the incoming call without suspending the conversation currently in progress while keeping the call as is and thereby decide whether or not to receive the incoming call.

A second mode of the present invention is the invention according to claim 1, further comprising another character string speech conversion section that converts, when information for identifying the corresponding caller is not obtained by the caller confirmation section, the information on the telephone number acquired by the telephone number acquisition section to speech information and another caller information notification section that notifies the user of the speech information converted by the other character string speech conversion section with speech at a volume level which does not disturb the call.

According to this configuration, in addition to the effect of the first mode of the present invention, even when an incoming call arrives from a caller who is not registered in the telephone directory during the call, the user of the present telephone apparatus can acquire the information on the telephone number of the caller while continuing the call with the other party of the call currently in progress.

A third mode of the present invention is either the first mode or the second mode of the present invention, further comprising an incoming call rejection setting section that makes a setting in information on the telephone numbers registered by the telephone directory information registration section so as to reject incoming calls during a call, wherein if the incoming call rejection is set in the information on the telephone number related to the incoming call when the incoming call arrives during the call, the incoming call is not notified to the user.

According to this configuration, in addition to the effect of either the first mode or second mode of the present invention, the user can set whether or not to notify the incoming call during the call for each party of incoming call and thereby prevent interference with the call by the incoming call notification from a caller with a low degree of emergency which may disturb the call currently in progress.

The present application is based on Japanese Patent Application No.2003-359426 filed on Oct. 20, 2003, entire content of which is expressly incorporated by reference herein.

INDUSTRIAL APPLICABILITY

The present invention is suitable for use in various telephone apparatuses other than portable radio telephone apparatuses.

The invention claimed is:

1. A telephone apparatus comprising:
   a call section that carries out a call-in-progress with one of a plurality of telephone apparatuses;
   a call waiting section that notifies a user of the telephone apparatus of an incoming call during the call-in-progress, holds the call-in-progress, and connects the incoming call;
   a telephone number acquisition section that acquires the telephone number of the telephone apparatus producing the incoming call;
   a telephone directory information registration section that registers telephone numbers associated with name information of telephone users;
   a caller determination section that searches said telephone numbers of said telephone directory information registration section based on said telephone number acquired by said telephone number acquisition section, determines whether or not said telephone number of the incoming call matches a telephone number within said telephone directory information registration section, and, if a match exists between the telephone number of the incoming call and a telephone number stored by the registration section, determines the name of the caller associated with the incoming call;
   an incoming call notification determination section that determines whether or not to notify the telephone apparatus user of the incoming call;
   a character string speech conversion section that converts character information of the name of said caller, determined by said caller determination section, to speech information; and
   a caller information notification section that notifies the telephone apparatus user of the name of the caller associated with the incoming call, when said incoming call arrives during a call-in-progress and said incoming call notification section determines that the incoming call notification is required, using said speech information from said character string speech conversion section with speech at a volume level which does not disturb the call-in-progress.

2. The telephone apparatus according to claim 1, further comprising:
   another character string speech conversion section that converts, when information for identifying said corresponding caller is not obtained by said caller determination section, the telephone number acquired by said telephone number acquisition section to speech information; and
   another caller information notification section that notifies the user of the telephone apparatus of said speech information converted by said other character string speech conversion section with speech at a volume level which does not disturb the call-in-progress.

3. The telephone apparatus according to claim 1, further comprising:
   an incoming call rejection setting section that makes a setting in information on said telephone numbers registered by said telephone directory information registration section so as to reject incoming calls during a call-in-progress, wherein
   if said incoming call rejection is set in the information on said telephone number related to said incoming call when the incoming call arrives during the call-in-progress, said incoming call is not notified to the user.

* * * * *